United States Patent [19]

Nakayama et al.

[11] 4,455,247

[45] Jun. 19, 1984

[54] COMPOSITION FOR USE IN AN ABSORPTION REFRIGERATION SYSTEM

[75] Inventors: Toshio Nakayama; Takeshi Kanai, both of Gunma, Japan

[73] Assignee: Sanyo Electric Co., Ltd., Osaka, Japan

[21] Appl. No.: 314,083

[22] PCT Filed: Feb. 9, 1981

[86] PCT No.: PCT/JP81/00026

§ 371 Date: Oct. 9, 1981

§ 102(e) Date: Oct. 9, 1981

[87] PCT Pub. No.: WO81/02301

PCT Pub. Date: Aug. 20, 1981

[30] Foreign Application Priority Data

Feb. 12, 1980 [JP] Japan ................... 55-16315

[51] Int. Cl.$^3$ ................................ C09K 5/04
[52] U.S. Cl. ...................... 252/67; 252/68; 252/52 A; 568/842; 568/852; 570/142
[58] Field of Search .............. 252/67, 68, 52 A; 568/842, 852; 570/142

[56] References Cited

U.S. PATENT DOCUMENTS 3,356,746 12/1967 Anello et al. .............. 568/842
3,418,337 12/1968 Middleton .................. 260/347.8

FOREIGN PATENT DOCUMENTS 657172 2/1963 Canada .................. 568/842
54-152257 11/1979 Japan ...................... 252/67

Primary Examiner—John E. Kittle
Assistant Examiner—Robert A. Wax
Attorney, Agent, or Firm—Hubbell, Cohen, Stiefel & Gross

[57] ABSTRACT

A composition for use in an absorption refrigeration system which comprises at least one refrigerant of a fluorinated alcohol having 2 to 10 carbon atoms, being a liquid at ordinary room temperature, and being vaporizable under normal atmospheric or reduced pressure when heated, and at least one absorbent having a higher boiling point at normal atmospheric pressure than the refrigerant and being capable of absorbing the refrigerant, and an absorption refrigeration system wherein said composition is used.

18 Claims, 4 Drawing Figures

COMPOSITION FOR USE IN AN ABSORPTION REFRIGERATION SYSTEM

This invention relates to a composition for an absorption refrigeration system comprising a refrigerant and an absorbent.

The composition which has been most widely used in an absorption refrigeration system consists of water or methanol, and a lithium halide. Water and methanol have the advantages of absorbing a large quantity of heat when vaporizing, and providing a high coefficient of performance (COP). A composition containing a lithium halide as an absorbent, however, is generally highly viscous, corrosive to metals, and easy to crystallize out. The use of such a composition also requires a condenser and an absorber which are cooled by water.

There is also known a composition which consists of ammonia and water. Ammonia has the advantage of absorbing a greater amount of heat when vaporizing than methanol, but has the disadvantage of requiring a high operating pressure. Moreover, the toxicity of ammonia has hindered the wide use of absorption refrigeration systems.

There is also known a composition consisting of a halogenated methane and dimethylformamide, but it provides only a low coefficient of performance (COP).

Another known composition consisting of a halogenated methane and tetraethylene glycol dimethyl ether disadvantageously requires a high operating pressure.

There are further known compositions consisting of halogenated methanes and furan derivatives as disclosed in U.S. Pat. Nos. 4,072,027 and 4,172,043.

None of these and other known compositions for use in an absorption refrigeration system has, however, been found satisfactory in performance.

Under these circumstances, this invention provides a novel composition for use in an absorption refrigeration system which has many advantages to be hereinafter described.

That is, according to this invention, there is provided a composition for use in an absorption refrigeration system which comprises at least one refrigerant of a fluorinated alcohol having 2 to 10 carbon atoms being a liquid at ordinary room temperature, and being vaporizable under normal atmospheric or reduced pressure when heated, and at least one absorbent having a higher boiling point at normal atmospheric pressure than the refrigerant, and being capable of absorbing the refrigerant.

As the fluorinated alcohols in the composition of this invention, there may be mentioned the fluorinated primary, secondary and tertiary alcohols represented by the general formulas (I), (II) and (III), respectively:

$$R^1-CH_2-OH \quad (I)$$

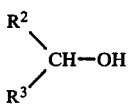
$$(II)$$

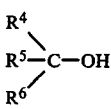
$$(III)$$

in which $R^1-CH_2-$,

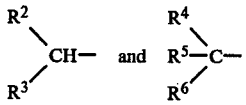

each stand for a halogen-substituted hydrocarbon group having at least one fluorine atom and 2 to 10 carbon atoms, and $R^1$, $R^2$, $R^3$, $R^4$, $R^5$ and $R^6$ each stand for a halogen (fluorine, or fluorine and chlorine)-substituted or unsubstituted hydrocarbon group. Examples of the unsubstituted hydrocarbon groups include alkyl groups such as methyl, ethyl, n- or iso-propyl, n-, iso-, sec- or tert-butyl, pentyl, hexyl, heptyl and octyl groups, cycloalkyl groups such as a cyclohexyl group, aryl groups such as phenyl and tolyl groups, and aralkyl groups such as benzyl and phenethyl groups.

Specific examples of the fluorinated primary alcohols having the formula (I) includes 2,2,2-trifluoro-1-ethanol, 2-monochloro-2,2-difluoro-1-ethanol, 2,2-difluoro-1-ethanol, 2-monofluoro-1-ethanol, 3,3,3,2,2-pentafluoro-1-propanol, 3,3,2,2-tetrafluoro-1-propanol, 4,4,4,3,3,2,2-heptafluoro-1-butanol, 4,4,4,3,2,2-hexafluoro-1-butanol, 5,5,4,4,3,3,2,2-octafluoro-1-pentanol, 5,5,5,4,4,3,2,2-octafluoro-1-pentanol, 7,7,6,6,5,5,4,4,3,3,2,2-dodecafluoro-1-heptanol, 2-(1,1,1-trifluoroethyl)-1-hexanol, 8,8,7,7,6,6,5,5,4,4,3,3-dodecafluoro-1-octanol, 2-(pentafluoroethyl)-1-hexanol, 2-(1,1,1-trifluoroethyl)-2-fluoro-1-hexanol, 2-(pentafluoroethyl)-2-fluoro-1-hexanol, 7,7,7-trifluoro-1-heptanol, 6,6,6-trifluoro-1-hexanol, 2,2,3,3-tetrafluoro-1-hexanol, 2,2,3,3-tetrafluoro-1-heptanol, 2,2,3,3-tetrafluoro-1-octanol, 6,6-difluoro-1-hexanol, 7,7-difluoro-1-heptanol, 8,8-difluoro-1-octanol, 2-(pentafluorophenyl)ethanol, 2,3,4,5,6-pentafluorobenzyl alcohol, 2-(2,3-difluorophenyl)ethanol, 3,3,3-trifluoro-2-(2,3-difluorophenyl)-1-propanol, and 3,3,3-trifluoro-2-(2,2-difluorocyclohexyl)-1-propanol.

Also, specific examples of the fluorinated secondary alcohols having the formula (II) include 4,4,3,3,1,1,1-heptafluoro-2-butanol, 1,1,1-trifluoro-2-octanol, 1,1,1-trifluoro-2-nonanol, 6,6,5,5,4,4,3,3,2,2-decafluoro-1-methyl-1-hexanol, 6,6,6,5,5,4,4,3,3,2,2-undecafluoro-1-methyl-1-hexanol, and 2,2,3,3,4,4,5,5-octafluoro-1-methyl-1-pentanol.

Specific examples of the fluorinated tertiary alcohols having the formula (III) include 7,7,7,6,6,5,5,4,4,3,3,2,2-tridecafluoro-1,1-dimethyl-1-heptanol, 2,2,3,3-tetrafluoro-1,1-dimethyl-1-propanol, 1,1,1-trifluoro-2-phenyl-2-propanol, 1,1,1,3,3,3-hexafluoro-2-phenyl-2-propanol, and 1,1,1,3,3,3-hexafluoro-2-(p-tolyl)-2-propanol.

It is preferable to use, among these alcohols, fluorinated lower aliphatic alcohols having a boiling point which is not higher than 120° C. at normal atmospheric pressure, since they make it possible to operate a refrigeration system with a heat source having a low temperature, and with a high thermal efficiency. Examples of the fluorinated lower aliphatic alcohols include 2,2,2-trifluoro-1-ethanol, 2,2-difluoro-1-ethanol, 2-monofluoro-1-ethanol, 3,3,3,2,2-pentafluoro-1-propanol, 3,3,2,2-tetrafluoro-1-propanol, 4,4,4,3,3,2,2-heptafluoro-1-butanol, and 4,4,4,3,2,2-hexafluoro-1-butanol. It is particularly preferable to use 2,2,2-trifluoro-1-ethanol having a boiling point of 74.5° C. at normal atmospheric pressure.

The absorbent for absorbing the fluorinated alcohol used as the refrigerant in the composition of this invention may essentially comprise an electron donative compound, since the alcohol is an electron acceptor. In other words, it may be an organic compound having an electron donative atom, such as an unpaired electron. From a standpoint of chemistry, it is an organic compound which can form a coordinate bond with an activated hydroxyl group in the fluorinated alcohol. From another standpoint, it can be said that an organic compound which can absorb the refrigerant alcohol can form a complex with the alcohol. Moreover, it is desirable to use as the absorbent a compound having an atmospheric boiling point which is higher preferably at least 50° C., and more preferably at least 100° C. than that of the refrigerant, and which can form a mixture of low viscosity with the refrigerant without solidification or crystallization.

It is suitable to use an absorbent having an atmospheric boiling point of at least 125° C., and preferably in the range of 175° C. to 300° C. Moreover, a suitable absorbent is such that, when it has absorbed the refrigerant, the resulting solution does not solidify or crystallize at a temperature which is not higher than 0° C., and preferably not higher than $-5°$ C., and has a viscosity which does not exceed 200 cps, and preferably 100 cps, at 0° C.

It is, thus, possible to use as the absorbent ethers, polyols, esters, amides, amines, imides, ketones, aldehydes and nitriles, and their two or more mixture.

The ethers include glycol ethers such as mono- or dialkyl ethers of polyalkylene glycols having 2 or 3 carbon atoms in the alkylene group, and cyclic ethers.

The polyalkylene glycol monoalkyl ethers include polyethylene glycol monoalkyl ethers of the formula (IV):

$$R^7(OCH_2CH_2)_nOH \quad (IV)$$

where $R^7$ is an alkyl group having 1 to 4 carbon atoms, and n is an integer of 2 to 5. Specific examples of these ethers include diethylene glycol monomethyl ether, diethylene glycol monoethyl ether, diethylene glycol monopropyl ether, triethylene glycol monomethyl ether, triethylene glycol monoethyl ether, triethylene glycol monopropyl ether, tetraethylene glycol monomethyl ether, tetraethylene glycol monoethyl ether, and tetraethylene glycol monopropyl ether.

The polyalkylene glycol dialkyl ethers include polyethylene glycol dialkyl ethers of the formula (V):

$$R^7(OCH_2CH_2)_nOR^8 \quad (V)$$

where $R^7$ and n are as defined above in connection with formula (IV), and $R^8$ is an alkyl group having 1 to 4 carbon atoms. Specific examples of these ethers include diethylene glycol dimethyl ether, diethylene glycol diethyl ether, diethylene glycol dipropyl ether, triethylene glycol dimethyl ether, triethylene glycol diethyl ether, triethylene glycol dipropyl ether, and tetraethylene glycol dipropyl ether.

The cyclic ethers include furan derivatives, of which examples, such as tetrahydrofurfuryl alcohol and ethyltetrahydrofurfuryl ether, are disclosed in U.S. Pat. No. 4,072,027.

The polyols include glycols, polyalkylene glycols having 2 or 3 carbon atoms in the alkylene group, and polyols having three or more hydroxyl groups.

The glycols include alkylene glycols having 2 to 6 carbon atoms, such as ethylene or propylene glycol. The polyalkylene glycols having 2 or 3 carbon atoms in the alkylene group include those of the formula (VI):

$$H(OCH_2CH_2)_nOH \quad (VI)$$

where n is an integer of 2 to 5, for example, diethylene glycol and triethylene glycol. Examples of the polyols having three or more hydroxyl group are glycerin, trimethylolpropane and hexanetriol, and addition products thereof to which 1 to 12 mols of an alkylene oxide having 2 or 3 carbon atoms have, for example, been added.

The esters include carboxylic, phosphoric and boric esters. The carboxylic esters include those derived from aliphatic, alicyclic or aromatic mono- or polycarboxylic acids having 1 to 8 carbon atoms, except the carbon atom or atoms in the carboxyl group or groups, for example, acetic acid, propionic acid, butyric acid, oxalic acid, malonic acid, adipic acid, tetrahydrophthalic acid or phthalic acid, and hydroxycarboxylic acids having 1 to 8 carbon atoms, except the carbon atom or atoms in the carboxyl group or groups, for example, glycolic acid, lactic acid, citric acid or tartaric acid.

Examples of the hydroxy compounds which form esters with those carboxylic acids include aliphatic, alicyclic or aromatic alcohols having 1 to 6 carbon atoms, such as methanol, ethanol, propanols, butanols, amyl alcohol, cyclohexanol and benzyl alcohol, and the glycol monoalkyl ethers and polyols which have hereinabove been listed.

Specific examples of the carboxylic esters formed by those carboxylic acids and hydroxy compounds include lower alcohol esters of dicarboxylic acids, such as dimethyl malonate or oxalate, monocarboxylic esters such as amyl acetate and butyl propionate, and glycol monoalkyl ether esters of monocarboxylic acids, such as ethylene glycol monomethyl ether acetate, ethylene glycol monoethyl ether acetate and diethylene glycol monoethyl acetate. It is also possible to use cyclic esters, for example, having 3 to 6 carbon atoms such as butyrolactone.

The phosphoric esters include esters formed by the above-mentioned hydroxy compounds or phenols, and phosphoric or polyphosphoric acid or other phosphorus-containing acids, such as triethyl, tributyl, triphenyl or tricresyl phosphate, and addition products obtained by adding, for example, 3 to 12 mols of ethylene oxide to phosphoric or polyphosphoric acid.

The boric esters include boric esters of the above hydroxy compounds, for example, boric triesters thereof, such as glycol ether triborate.

The amides include compounds of the formula (VII):

$$R^9CON\begin{matrix}R^{10}\\R^{11}\end{matrix} \quad (VII)$$

where $R^9$, $R^{10}$ and $R^{11}$ each stands for a hydrogen atom, or an alkyl group having 1 to 10 carbon atoms, or a phenyl group, for example, dimethylformamide, dimethylacetamide, diethylformamide, formamide, acetamide and acetanilide; cyclic amides such as lactams having at least 3, and preferably 4 to 12, carbon atoms, for example, pyrrolidone, caprolactam, caprilactam and laurolactam; $C_1$–$C_4$ alkyl-substituted derivatives of said lactams, for example, N-methyl-2-pyrrolidone and N-ethyl-2-pyrrolidone; and addition products obtained by adding 1 to 10 mols of an alkylene having 2 or 3 carbon atoms to the abovementioned lactams.

The amines include aliphatic monoamines having at least 6, and preferably 7 to 15, carbon atoms, for example, primary amines such as heptylamine, secondary amines such as dihexylamine, and tertiary amines such as trioctylamine; aliphatic polyamines, for example, alkylene diamines such as trimethylenediamine and hexamethylenediamine; polyalkylenepolyamines, for example, polyethylenepolyamines having a polymerization degree of 2 to 6, such as triethylenetetramine; alicyclic amines such as cyclohexylamine, dicyclohexylamine, isophoronediamine and dicyclohexylmethanediamine; aromatic amines such as benzylamine, dibenzylamine and xylenediamine; heterocyclic amines such as morpholines, aminothiazoles, imidazoles, piperidines, pyrazoles, pyrazolines, piperazines, pyrrolidines, indoles and quinolines; and hydroxyalkyl-substituted products of these amines, or addition products obtained by adding 1 to 10 mols of alkylene oxide to these amines, for example, diethylaminoethanol and morpholinemonoethyleneoxide; and alkanolamines, such as mono-, di- or triethanolamine, propanolamine, butanolamine and diethylaminoethanol.

The imides include imides of dicarboxylic acids having 4 to 10 carbon atoms, such as maleimide and succinimide, and N—$C_1$–$C_4$ alkyl, amino ($C_2$–$C_6$ alkyl) and $C_2$–$C_4$ hydroxyalkyl substituted products of these imides.

The ketones include cyclohexanone, isophorone, acetylacetone and acetonitrileacetone. The aldehydes include those having 6 to 12 carbon atoms, for example, heptaldehyde. The nitriles include those having 5 to 12 carbon atoms, for example, valeronitrile.

If these absorbents are shown with respect to their power of absorbing 2,2,2-trifluoroethanol as the refrigerant, amides (including cyclic amides), phosphoric esters, ethers and polyols, alkanolamines, ketones, boric esters, carboxylic ester, aldehydes and amines are in the order. On the other hand, the order of the thermal stability is ethers and polyols, cyclic amides, alkanolamines and carboxylic esters. According to these properties, it is appropriate to employ ethers, particularly glycol ethers, or cyclic amides as the absorbent for this invention. Preferred glycol ethers are polyethylene glycol monoalkyl ethers of the formula (IV), particularly diethylene glycol monomethyl ether. Preferred cyclic amides are N-alkyl-2-pyrrolidones, particularly N-methyl-2-pyrrolidone.

The quantities of the fluorinated alcohol refrigerant and the absorbent in the composition of this invention are not critical, but variable in a wide range. The quantity of the fluorinated alcohol may be in the range of 5 to 60% by weight, and preferably 10 to 50% by weight, and the quantity of the absorbent may be in the range of 40 to 95% by weight, and preferably 50 to 90% by weight, based on the total weight of the composition.

If an organic amine is added to the absorbent, particularly an ether or polyol, it is possible to prevent corrosion of the metal (iron) of which the refrigeration system is made. It is particularly useful to add an organic amine having a boiling point which is not higher than 150° C., since it mixes into the vaporized fluorinated alcohol from the generator, and prevents corrosion of the metal of which the various parts of the refrigeration system, from the generator to the evaporator, are made. The addition of any such amine also has the advantage of mitigating the degassing requirements of the refrigeration system, and improving any difficulty encountered in the operation of the refrigeration system when its incomplete degassing brings about heavy changes in vapor pressure. It is preferable to use an organic amine having a boiling point of 150° C. or below, particularly in the range of 50° C. to 130° C. Such an amine may, for example, be selected from among the amines which may be used as the absorbent, and which have a boiling point at least 50° C. in excess of that of the refrigerant, but not exceeding 150° C., and other lower-boiling amines. Suitable examples of the amines include aliphatic amines, for instance, aliphatic primary amines having 1 to 6 carbon atoms, such as methylamine, ethylamine, propylamine, butylamine, amylamine and other alkylamines, or 3-methoxypropylamine, 3-ethoxypropylamine and other alkoxyalkylamines; aliphatic secondary amines having 2 to 7 carbon atoms, such as dimethylamine, diethylamine and dipropylamine, and aliphatic tertiary amines having 3 to 7 carbon atoms, such as trimethylamine and triethylamine, alicyclic amines such as cyclohexylamine, and heterocyclic amines such as morpholine. Although the quantity of the organic amine to be added depends on its boiling point, it may be in the range of usually 0.05 to 10%, and preferably 0.1 to 5%, by weight based on the weight of the absorbent. If a low-boiling amine having a boiling point which is not higher than, namely, 100° C. is employed, it is sufficient to add only a small quantity thereof (for example, 0.05 to 1% by weight), but in case of a high-boiling amine having a boiling point of, namely, 100° C. to 150° C., it is preferable to employ a relatively large quantity (for example, 1 to 5% by weight). If an amine which can also be used as the absorbent is employed, it is possible to employ a larger quantity (i.e., 5 to 100% by weight).

It is also possible to add water to the composition of this invention. The addition of water is effective for preventing the corrosion of carbon steel. It is preferable to add 0.08 to 0.5% by weight of water based on the total weight of the composition.

It is further possible to add a stabilizer and a corrosion inhibitor to the composition of this invention to improve its thermal stability and noncorrosiveness, if required. It is possible to add, for example, an oxidation inhibitor such as benzotriazole, mercaptobenzotriazole or a hindered phenol (e.g., 2,6-di-t-butylphenol), a phosphite as disclosed in U.S. Pat. Nos. 3,459,660 and 4,072,027, and copper oxide as disclosed in U.S. Pat. No. 2,582,306. The quantity of these additives may be usually 5% or below, and preferably in the range of 0.01 to 2%, by weight based on the weight of the composition.

According to another point of view, this invention provides, in an absorption refrigeration system employing a volatile refrigerant and as absorbent, the system which employs at least one refrigerant composed of a fluorinated alcohol having 2 to 10 carbon atoms which is a liquid at ordinary room temperature, but vaporizes under normal atmospheric or reduced pressure when heated, and at least one absorbent having a higher boiling point at normal atmospheric pressure than the refrigerant, and capable of absorbing it.

A conventional absorption refrigeration system can be adapted in operation of the composition of this invention.

Further, FIG. 1 is a schematic diagram of a typical absorption refrigeration system.

Figure 1:
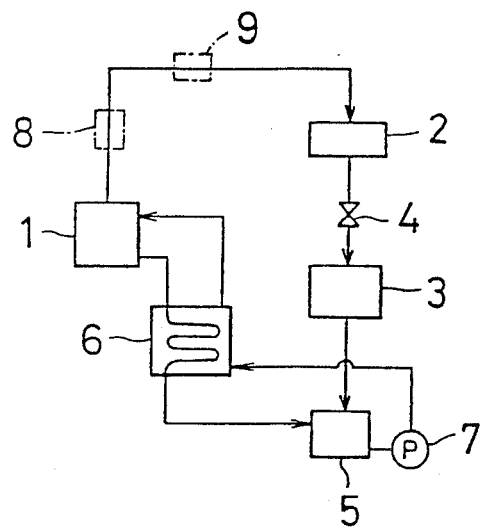

Generally, an absorption refrigeration system has a basic arrangement of cycle as indicated in FIG. 1. (1) is a generator for heating the absorbent solution, which has absorbed the refrigerant and has been thereby diluted (the composition formed by absorbing the refrigerant into the absorbent), to separate the refrigerant from the absorbent solution; (2) is a condenser for cooling and liquefying the refrigerant vapor from the generator (1); (3) is an evaporator for evaporating the liquefied refrigerant from the condenser (2), passing it through a pressure control device or pressure regulating means (4) and scattering it at a reduced pressure, thereby a desired cooling function of the refrigeration system is attained; (5) is an absorber for absorbing the refrigerant vapor blowing from the evaporator (3), whereby the continuous cooling function at the evaporator (3) is maintained; (6) is a heat exchanger for heat exchanging the absorbent solution (a concentrated solution), which separates the refrigerant in the generator (1) and has a high concentration of the aboosrbent, with the absorbent solution (a diluted solution), which returns from the absorber (5) to the generator (1) and has a low concentration of the absorbent; (7) is a circulation pump; and (8) and (9) are an analyzer and a rectifier, for separating the refrigerant and the absorbent boiled off the solution in the generator (1).

The refrigerating cycle of an absorption refrigeration system employing a fluorinated alcohol as the refrigerant as hereinabove described, thus, includes the steps of generation of the refrigerant vapor from the absorbent, solution having a low concentration of the absorbent, condensation and liquefaction of the refrigerant vapor, reduction in pressure of the liquefied refrigerant, evaporation thereof, and absorption of the refrigerant vapor into the absorbent solution having a high concentration of the absorbent.

The concentrations of the absorbent in those concentrated and dilute solutions may be selected appropriately to suit the absorbent which is employed, and the operating conditions, i.e., the temperature to which the dilute solution is heated (generator temperature), the temperature at which the liquefied refrigerant evaporates (evaporator temperature), and the temperature at which the refrigerant vapor is absorbed (absorber temperature).

The use of the composition of this invention in an absorption refrigeration system as mentioned above provides the following advantages as will later be demonstrated in detail by examples:

(1) No analyzer or rectifier is required, since there is no azeotropy of the composition, and since the absorbent has a boiling point which is higher by at least 50° C. than that of the refrigerant;

(2) Since the refrigeration system can be operated at a low pressure, there is no danger of liquid or gas leakage therefrom, and therefore, it is possible to lower the strength of the apparatus, and simplify its maintenance;

(3) A high rate of drop in vapor pressure is achieved;

(4) The low viscosity of the composition requires only a small amount of power for its circulation;

(5) The freedom of the composition from crystallization reduces the power required for circulating it, and its resistance to heat transfer and it provides the use in cold district;

(6) The composition does not cause any appreciable corrosion of iron; and (7) The composition has no toxicity.

If a fluorinated alcohol having a boiling point which is not higher than 120° C. is used as the refrigerant, the following additional advantages can be obtained:

(1) It is not necessary to heat the composition to a very high temperature when separating the refrigerant therefrom;

(2) The air can be satisfactorily used for the condenser and the absorber, since the refrigerant can be condensed at a temperature of 40° C. to 60° C.; and (3) A high coefficient of performance (COP) can be obtained.

Thus, if any such fluorinated alcohol is used as the refrigerant, it is possible to separate the refrigerant from the absorbent solution even if it is not heated to a high temperature in the generator (1), and condense and liquefy the refrigerant even if it is not cooled to a low temperature in the condenser (2) as in a conventional absorption refrigeration system. For example, therefore, if the refrigerant can be separated from the absorbent solution when heated to a temperature of 80° C. to 200° C., particulary 80° C. to 120° C. in the generator (1), solar heat can be used as a heat source for the generator to facilitate its operation. As the refrigerant can be condensed and liquefied at a temperature of 40° C. to 60° C., it is sufficient to use an air-cooled condenser, and as the liquefied refrigerant can be absorbed in the absorber at a temperature of 40° C. to 60° C., it is sufficient to use an air-cooled absorber. In addition to these advantages, as the composition of this invention permits evporation of the refrigerant at a temperature of 5° C. to 10° C., it enables the refrigerant to absorb a large quantity of heat when it evaporates, and has no appreciable toxicity, it drastically increases the adaptability of an air-cooled absorption refrigeration system.

The composition of this invention is applicable to both air-cooled and water-cooled absorption refrigeration systems, and various kinds of refrigeration systems, such as the air-conditioning of houses, buildings and factories.

The invention will now be described more specifically with reference to examples, which are not intended to limit the scope of this invention.

EXAMPLE 1

The reflux boiling points of TFE in different compositions containing 30% by weight of TFE and 70% by weight of different organic compounds as the absorbent as shown in TABLE 1 were measured, and are shown in TABLE 1. As is obvious from TABLE 1, various compounds, such as amines, alkanolamines, amides, ethers, esters, phosphric esters, boric esters, ketones and aldehydes, were found to elevate the boiling point of TFE drastically by forming a complex therewith. In other words, these compounds were found to show an outstanding power of absorbing TFE by forming a complex therewith. It was ascertained that the elevation in the boiling point of TFE was not due to azeotropy, but due to the formation of a complex.

TABLE 1

Elevation in the boiling point of TFE in various organic compounds.

| Classification | Organic compounds as absorbent Name of compound | Boiling point (°C.) | Reflux boiling point (°C.) of TFE in composition |
|---|---|---|---|
| Amine | Dimethyllaurylamine | 217 | 109 |
| | N—methyldicyclohexylamine | — | 104 |
| | Quinoline | 234 | 129 |
| Alkanolamine | Monoethanolamine | 171 | 150 |
| | Monoisopropanolamine | 161 | 136 |
| Amide | Dimethylformamide | 153 | 151 |
| | Dimethylacetamide | 164 | 160 |
| | 2-Pyrrolidone | 245 | 159 |
| | N—methyl-2-pyrrolidone | 202 | 167 |
| Ether | Diethylene glycol dimethyl ether | 162 | 143 |
| | DME | 196 | 144 |
| | Tetrahydrofurfuryl alcohol | 178 | 145 |
| Glycol | Diethylene glycol | 245 | 142 |
| Ester | Ethyl acetoacetate | 181 | 121 |
| | Diethyl oxalate | 186 | 121 |
| | Dimethyl malonate | 180 | 123 |
| Ketone | Cyclohexanone | 156 | 125 |
| | Isophorone | 215 | 134 |
| | Acetonylacetone | 188 | 137 |
| Phosphoric ester | Triethyl phosphate | 211 | 156 |
| | Tributyl phosphate | 289 | 142 |
| Boric ester | Triglycol ether borate | — | 134 |
| Aldehyde | n-Heptaldehyde | 141 | 117 |
| Boiling point of TFE alone: | | | 74.5° C. |

EXAMPLE 2

The reflux boiling points of fluorinated alcohols in different compositions containing 65% by weight of 2-pyrrolidone and 35% by weight of different fluorinated alcohols as shown in TABLE 2 were measured, and are shown in TABLE 2. As is obvious from the results shown therein, these fluorinated alcohols were found to have a drastically elevated boiling point in 2-pyrrolidone, and form a complex therewith. It was ascertained that the elevation in the boiling points of the fluorinated alcohols was not due to azeotropy, but due to the formation of a complex.

TABLE 2

Elevation in the boiling points of fluorinated alcohols in 2-pyrrolidone.

| Fluorinated alcohol Name | Boiling point (°C.) | Reflux boiling point (°C.) of fluorinated alcohol in 2-pyrrolidone |
|---|---|---|
| TFE | 74.5 | 141 |
| 2-Monofluoro-1-ethanol | 105 | 149 |
| 2,2,3,3-Tetrafluoro-1-propanol | 109 | 194 |
| 2,2,3,4,4-Hexafluoro-1-butanol | 114 | 189 |
| 2,2,3,3,4,4,5,5-Octafluoro-1-pentanol | 139 | 208 |

EXAMPLE 3

Figure 2:
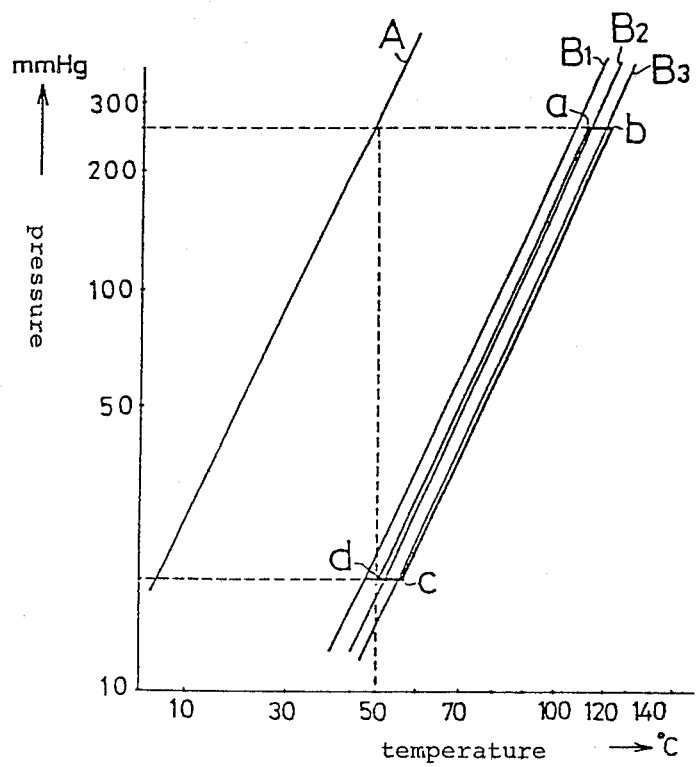
FIG. 2 is a diagram showing the cycle of refrigerant vapor and absorbent with reference to pressure, temperature and concentration employing 2,2,2-trifluoro-1-ethanol (TFE) as the refrigerant, and diethylene glycol monomethyl ether (DME) as the absorbent.

The vapor pressure-temperature relationship in a composition comprising 26.919% by weight of TFE as the refrigerant, 72.781% by weight of DME as the absorbent and 0.30% by weight of water was determined, and is shown in FIG. 2. Line A shows the saturated vapor pressure of TFE in relation to temperature, while lines $B_1$, $B_2$ and $B_3$ are based on the vapor pressure in relation to temperature of compositions having a TFE to DME ratio by weight of 30:70, 25:75 and 20:80, respectively. TFE and DME were found to have a boiling point of 75° C. and about 196° C., respectively, though they are not shown in FIG. 2.

The absorption refrigeration system as shown in FIG. 1 was operated with a composition having a TFE to DME ratio by weight of 27:73, and showed a vapor pressure-temperature relationship as approximately illustrated by thick solid lines in FIG. 2.

TFE was introduced into the generator (1) as shown at a in FIG. 2 to form a dilute absorbent solution having a TFE to DME ratio by weight of 27:73. The solution was heated to about 117° C. as shown at b in FIG. 2, and the TFE vapor was separated from the absorbent and fed into the condenser (2). The absorbent solution thereby concentrated, and having an absorbent concentration of about 81% by weight was cooled in the heat exchanger (6), and fed into the absorber (5) (c in FIG. 2). The TFE vapor was cooled to about 50° C. and liquefied in the condenser (2), and the liquefied TFE was fed through the pressure reducing device (4) into the evaporator (3) having a pressure of about 19 mm Hg. When the liquefied TFE was being evaporated in the evaporator (3), it cooled the object surrounding the evaporator (3) to about 5° C. The pressure of the evaporator (3) was maintained at about 19 mm Hg, as the TFE vapor was continuously absorbed into the concentration absorbent solution in the absorber (5). The solution diluted by absorbing the TFE vapor (d in FIG. 2) was heated in the heat exchanger (6) by the concentrated absorbent solution flowing from the generator (1) to the absorber (5), and returned into the generator (1) (a in FIG. 2).

In the absorption refrigerating cycle as hereinabove described, TFE has a boiling point which is lower by about 120° C. than DME as stated before and there is not azeotropic mixture. Therefore, the analyzer (8) and the rectifier (9) can be eliminated, and the construction or arrangement of the absorption refrigeration system can be simplified accordingly.

Accordingly to a feature of this invention, the absorption refrigeration system can be operated at a pressure of about 250 mm Hg on the high pressure side where the generator (1) is located, and about 20 mm Hg on the low pressure side where the evaporator (3) is situated, or in other words, at a pressure which is lower than atmospheric pressure on both the high and low pressure sides. On the other hand, conventionally known refrigerant compositions, such as those composed of ammonia and water, or flon and tetraethylene glycol dimethyl ether, require a high operating pressure of 10 to 20 kg/cm² on the high pressure side of the refrigeration system, and about 5 kg/cm² even on the low pressure side thereof. Therefore, the use of the composition according to this invention relieves the absorption refrigeration system from any danger of liquid or vapor leakage, and thereby makes it possible to mitigate its strength requirements and simplify its maintenance.

Moreover, the composition of this invention does not crystallize or have any undue increase in viscosity as far as the absorption refrigeration system is operated under normal conditions, and therefore, does not cause any failure of system operation even in cold regions. As the condenser (2) and the absorber (3) can be of the air-cooled type, it is not necessary to provide the refrigeration system with any water cooling apparatus or cooling tower as required when a composition comprising water and lithium bromide is employed. Thus, the composition of this invention permits operation of an absorption refrigeration system even in a district where no sufficient water is available.

Although the operation of the refrigeration system in this example was conducted with a difference of about 8% by weight in the concentration of DME in the composition during the refrigerating cycle, it is, of course, possible to vary the DME concentration and its difference during the refrigerating cycle, as is apparent from FIG. 2.

EXAMPLE 4

A vapor pressure-temperature relationship substantially duplicating that of FIG. 2 was obtained with a composition containing 26.838% by weight of TFE, 72.562% by weight of DME, 0.299% by weight of water and 0.30% by weight of benzotriazole. It was found effective to employ 0.03 to 0.5% by weight of benzotriazole.

EXAMPLE 5

Figure 3:
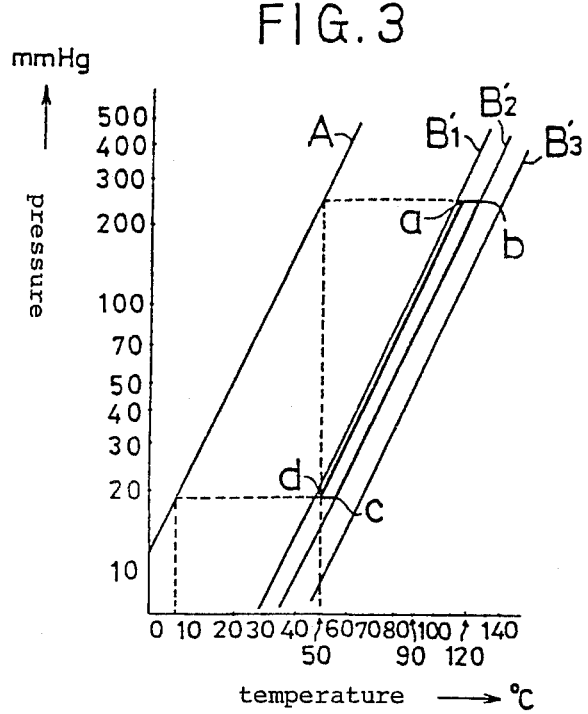
FIG. 3 is another diagram showing the cycle of refrigerant vapor and absorbent with reference to temperature, pressure and concentration employing TFE as the refrigerant, and N-methyl-2-pyrrolidone as the absorbent.

Vapor pressure-temperature relationships were determined with compositions having different concentrations of TFE as the refrigerant and N-methyl-2-pyrrolidone, and are shown in FIG. 3. Line A shows the saturated vapor pressure of TFE in relation to temperature, while lines $B_1'$, $B_2'$ and $B_3'$ show the vapor pressures, in relation to temperature, of compositions having a TFE to N-methyl-2-pyrrolidone ratio by weight of 50:50, 40:60 and 30:70, respectively. TFE and N-methyl-2-pyrrolidone were found to have a boiling point of 75° C. and 202° C., respectively.

The absorption refrigeration system as shown in FIG. 1 was operated with a composition having a TFE to N-methyl-2-pyrrolidone ratio by weight of 48:52, and showed a vapor pressure-temperature relationship as approximately illustrated by thick solid lines in FIG. 3.

TFE was introduced into the generator (1) (a in FIG. 3) to form a dilute absorbent solution having a TFE to N-methyl-2-pyrrolidone ratio by weight of 48:52. The solution was heated to about 114° C. (b in FIG. 3), and the TFE vapor was separated from the absorbent and fed into the condenser (2). On the other hand, the remaining concentrated solution containing about 60% by weight of N-methyl-2-pyrrolidone was cooled in the heat exchanger (6), and fed into the absorber (5) (c in FIG. 3). The TFE vapor was cooled to about 50° C. and liquefied in the condenser (2), and the liquefied TFE was fed through the pressure reducing device (4) into the evaporation (3) having a pressure of about 19 mm Hg. When the liquefied TFE was being evaporated in the evaporator (3), it cooled the object surrounding the evaporator (3) to about 5° C. The pressure of the evaporator (3) was maintained at about 19 mm Hg, as the TFE vapor was continuously absorbed into the concentrated absorbent solution in the absorber (5). The solution diluted by absorbing the TFE vapor (d in FIG. 3) was heated in the heat exchanger (6) by the concentrated solution flowing from the generator (1) to the absorber (5), and returned into the generator (1) (a in FIG. 3).

In the absorption refrigerating cycle as hereinabove described, TFE has a boiling point which is about 130° C. lower than that of N-methyl-2-pyrrolidone as stated before, and there is no azeotropic mixture formed. Therefore, the analyzer (8) and the rectifier (9) can be eliminated from the absorption refrigeration system, and its construction or arrangement can be simplified accordingly.

According to a salient feature of this invention, an absorption refrigeration system can be operated at a pressure of about 250 mm Hg on its high pressure side where the generator is located, and about 20 mm Hg on its low pressure side where the evaporator is situated, or in other words, at a pressure which is lower than atmospheric pressure on both the high and low pressure sides thereof. On the other hand, conventionally known refrigerant compositions, such as those composed of ammonia and water, or flon and tetraethylene glycol dimethyl ether, require a high operating pressure of 10 to 20 $kg/cm^2$ on the high pressure side of the system, and about 5 $kg/cm^2$ even on the low pressure side thereof. Therefore, the use of the composition according to this invention relieves the absorption refrigeration system from any danger of liquid or vapor leakage, and thereby makes it possible to mitigate its strength requirements and simplify its maintenance.

Moreover, the composition of this invention does not crystallize or have any undue increase in viscosity as far as the absorption refrigeration system is operated under normal conditions, and therefore, does not cause any failure of system operation even in a cold region. As the condenser (2) and the absorber (3) can be of air-cooled type, it is not necessary to provide the system with any water cooling apparatus or cooling tower as required when a composition comprising, for example, water and lithium bromide is employed. Thus, the composition of this invention permits operation of an absorption refrigeration system even in a district where no sufficient water is available.

Although the operation of the system in this example was conducted with a difference of about 8% by weight in the concentration of N-methyl-2-pyrrolidone in the composition during the refrigerating cycle, it is, of course, possible in accordance with this invention to vary the absorbent concentration and its difference during the refrigerating cycle, as is apparent from FIG. 3.

EXAMPLE 6

Figure 4:
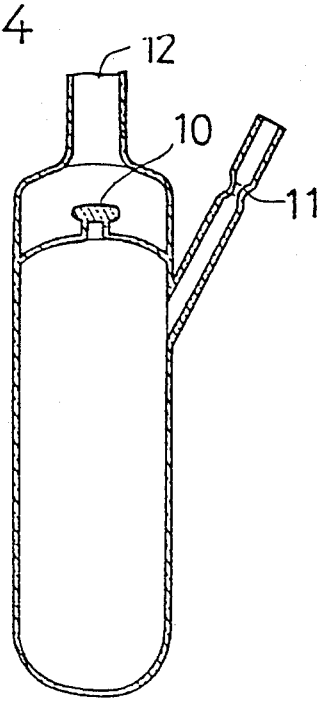
FIG. 4 is a longitudinal sectional view of a pressure resistant glass tube employed for determining heat resistance and vapor pressure in EXAMPLE 6 which will later be described.

A mixture of TFE and DME having a TFE to DME ratio by weight of 25:75 was placed in a pressure resistant glass tube having a breakable seal (10), a sealed sample inlet (11) and a connector (12) to a vapor pressure measuring device as shown in FIG. 4. After 1% by weight of an organic amine and a metal piece (piano wire) had been put into the glass tube, it was cooled to −78° C., degassed, and heated to 50° C. This cycle of operations was repeated twice, and the glass tube having its interior degassed was sealed. Then, the glass tube was left at a temperature of 175° C. for three weeks. Thereafter, it was cooled to 50° C., and connected to a vapor pressure measuring device. The breakable seal was broken by application of a mechanical force, and the vapor pressure was measured. The results are shown in TABLE 3. Substantially the same results were obtained when the degassing cycle was repeated five times. This indicates that satisfactory degassing is possible even under the conditions which appear to be somewhat incomplete. At the same time, the piano wire was inspected visually for corrosion, but no corrosion was found.

TABLE 3

| Organic amine | Vapor pressure (mmHg) |
|---|---|
| Diethylamine | 20.5 |
| Morpholine | 21.0 |
| 3-Methoxy-propylamine | 20.0 |
| Benzylamine | 22.0 |

EXAMPLE 7

1% by weight of an organic amine as shown in TABLE 4 below was added into a mixture of TFE and DME having a TFE to DME ratio by weight of 25:75. The resulting mixture was placed in a Claisen flask for distillation of TFE, and the quantity of the organic amine in the TFE distillate was measured. The results are shown in TABLE 4.

TABLE 4

| Organic amine | Boiling point of organic amine (°C.) | Run No. | Quantity of TFE distillate (wt. % of original weight) | Quantity of organic amine in TFE distillate (ppm) |
|---|---|---|---|---|
| Diethylamine | 56 | 1 | 2.18 | 2,100 |
| | | 2 | 1.84 | 3,100 |
| | | 3 | 2.48 | 1,400 |
| 3-Methoxy-propylamine | 118 | 1 | 1.95 | 1,020 |
| | | 2 | 2.36 | 1,200 |
| | | 3 | 2.01 | 980 |
| Morpholine | 129 | 1 | 1.79 | 580 |
| | | 2 | 1.98 | 490 |
| | | 3 | 2.20 | 450 |
| Benzylamine | 185 | 1 | 2.06 | 0 |
| | | 2 | 1.82 | 0 |
| | | 3 | 1.72 | 0 |

TABLE 4 indicates the presence of the amines having a boiling point lower than 150° C. in the TFE distillate. Those amines prevent corrosion of the metal (particularly iron) of which various parts of the refrigeration system, from the generator to the evaporator, are made.

We claim:

1. A composition for use in an absorption refrigeration system comprising at least one refrigerant, said at least one refrigerant comprising a fluorinated alcohol having 2 to 10 carbon atoms, being a liquid at ordinary room temperature and being vaporizable under normal atmospheric or reduced pressure when heated, and at least one absorbent, said at least one absorbent having a higher boiling point at normal atmospheric pressure than the refrigerant and being capable of absorbing the refrigerant, and comprising an electron donative compound selected from the group consisting of ethers, esters, polyols, amides, amines, imides, ketones, aldehydes and nitriles.

2. A composition as described in claim 1 wherein the fluorinated alcohol is selected from the group consisting of fluorinated primary, secondary and tertiary alcohols of the following formulas (I), (II) and (III), respectively:

$$R^1\text{---}CH_2\text{---}OH \quad (I)$$

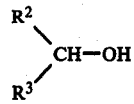  (II)

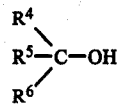  (III)

wherein $R^1$—$CH_2$—,

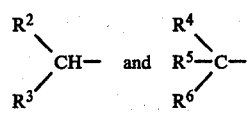

each is a halogen-substituted hydrocarbon group having at least one fluorine atom and 2 to 10 carbon atoms.

3. A composition as described in claim 2, wherein the fluorinated primary alcohol is 2,2,2-trifluoro-1-ethanol, 2-monochloro-2,2-difluoro-1-ethanol, 2,2-difluoro-1-ethanol, 2-monofluoro-1-ethanol, 3,3,3,2,2-pentafluoro-1-propanol, 3,3,2,2-tetrafluoro-1-propanol, 4,4,4,3,3,2,2-heptafluoro-1-butanol, 4,4,4,3,2,2-hexafluoro-1-butanol, 5,5,4,4,3,3,2,2-octafluoro-1-pentanol, 5,5,5,4,4,3,2,2-octafluoro-1-pentanol, 7,7,6,6,5,5,4,4,3,3,2,2-dodecafluoro-1-heptanol, 2-(1,1,1-trifluoroethyl)-1-hexanol, 8,8,7,7,6,6,5,5,4,4,3,3-dodecafluoro-1-octanol, 2-(pentafluoroethyl)-1-hexanol, 2-(1,1,1-trifluoroethyl)-2-fluoro-1-hexanol, 2-(pentafluoroethyl)-2-fluoro-1-hexanol, 7,7,7-trifluoro-1-heptanol, 6,6,6-trifluoro-1-hexanol, 2,2,3,3-tetrafluoro-1-hexanol, 2,2,3,3-tetrafluoro-1-heptanol, 2,2,3,3-tetrafluoro-1-octanol, 6,6-difluoro-1-hexanol, 7,7-difluoro-1-heptanol, 8,8-difluoro-1-octanol, 2-(pentafluorophenyl)ethanol, 2,3,4,5,6-pentafluorobenzyl alcohol, 2-(2,3-difluorophenyl)ethanol, 3,3,3-trifluoro-2-(2,3-difluorophenyl)-1-propanol, or 3,3,3-trifluoro-2-(2,2-difluorocyclohexyl)-1-propanol.

4. A composition as described in claim 2, wherein the fluorinated secondary alcohol is 4,4,3,3,1,1,1-heptafluoro-2-butanol, 1,1,1-trifluoro-2-octanol, 1,1,1-trifluoro-2-nonanol, 6,6,5,5,4,4,3,3,2,2-decafluoro-1-methyl-1-hexanol, 6,6,6,5,5,4,4,3,3,2,2-undecafluoro-1-methyl-1-hexanol, or 2,2,3,3,4,4,5,5-octafluoro-1-methyl-1-pentanol.

5. A composition as described in claim 2, wherein the fluorinated tertiary alcohol is 7,7,7,6,6,5,5,4,4,3,3,2,2-tridecafluoro-1,1-dimethyl-1-heptanol, 2,2,3,3-tetrafluoro-1,1-dimethyl-1-propanol, 1,1,1-trifluoro-2-phenyl-2-propanol, 1,1,1,3,3,3-hexafluoro-2-phenyl-2-propanol, or 1,1,1,3,3,3-hexafluoro-2-(p-tolyl)-2-propanol.

6. A composition as described in any one of claims 1-5, wherein the fluorinated alcohol has a boiling point of 120° C. or below at normal atmospheric pressure.

7. A composition as described in claim 2, wherein the fluorinated primary alcohol is 2,2,2-trifluoro-1-ethanol.

8. A composition as described in claim 1, wherein the absorbent is an electron donative compound.

9. A composition as described in claim 8, wherein the ether is a polyethylene glycol monoalkyl electron donative compound of the formula (IV):

$$R^7(OCH_2CH_2)_nOH \quad (IV),$$

or a polyethylene glycol dialkyl ether of the formula (V):

$$R^7(COH_2CH_2)_nOR^8 \quad (V)$$

wherein $R^7$ and $R^8$ each is an alkyl group having 1 to 4 carbon atoms; n is an integer of 2 to 5.

10. A composition as described in claim 9, wherein the polyethylene glycol monoalkyl ether is diethylene glycol monomethyl ether, diethylene glycol monoethyl ether, diethylene glycol monopropyl ether, triethylene glycol monomethyl ether, triethylene glycol monoethyl ether, triethylene glycol monopropyl ether, tetraethylene glycol monomethyl ether, or tetraethyleneglycol monopropyl ether.

11. A composition as described in claim 10, wherein the polyethylene glycol monoalkyl ether is diethylene glycol monomethyl ether.

12. A composition as described in claim 9, wherein the polyethylene glycol dialkyl ether is diethylene glycol dimethyl ether, diethylene glycol diethyl ether, diethylene glycol dipropyl ether, triethylene glycol dimethyl ether, triethylene glycol diethyl ether, triethylene glycol dipropyl ether, or tetraethylene glycol dipropyl ether.

13. A composition as described in claim 8, wherein the electron donative compound is an alkyl-substituted lactam having at least 3 carbon atoms.

14. A composition as described in claim 13, wherein the alkyl-substituted lactam having at least 3 carbon atoms is N-methyl-2-pyrrolidone or N-ethyl-2-pyrrolidone.

15. A composition as described in claim 1 which contains 5 to 60% of said fluorinated alcohol and 40 to 95% of said absorbent, based on the weight of the composition.

16. A composition as described in claim 1 which contains water in an amount of 0.05 to 1.0% by weight based on the weight of the composition.

17. A composition as described in claim 1 which contains an organic amine having a boiling point of 150° C. or below in an amount of 0.05 to 10% by weight based on the weight of the absorbent.

18. In an absorption refrigeration system using a volatile refrigerant and an absorbent, the system comprising at least one refrigerant, said at least one refrigerant comprising a fluorinated alcohol having 2 to 10 carbon atoms, being a liquid at ordinary room temperature, and being vaporizable under normal atmospheric or reduced pressure when heated, and at least one absorbent having a higher boiling point at normal atmospheric pressure than the refrigerant and being capable of absorbing the refrigerant, and comprising an electron donative compound selected from the group consisting of ethers, esters, polyols, amides, amines, imides, ketones, aldehydes and nitriles.

* * * * *

UNITED STATES PATENT AND TRADEMARK OFFICE
CERTIFICATE OF CORRECTION

PATENT NO. : 4,455,247
DATED : June 19, 1984
INVENTOR(S) : Toshio Nakayama et al.

It is certified that error appears in the above-identified patent and that said Letters Patent is hereby corrected as shown below:

Column 8, line 46, "evporation" should read -- evaporation --.

Column 10, lines 37-38, "concentration" should read

-- concentrated --.

Column 11, line 60, "evaporator" should read -- evaporator --.

Signed and Sealed this

Twenty-sixth Day of March 1985

[SEAL]

Attest:

DONALD J. QUIGG

Attesting Officer     Acting Commissioner of Patents and Trademarks

UNITED STATES PATENT AND TRADEMARK OFFICE
CERTIFICATE OF CORRECTION

PATENT NO. : 4,455,247
DATED : June 19, 1984
INVENTOR(S) : Toshio Nakayama et al.

It is certified that error appears in the above-identified patent and that said Letters Patent is hereby corrected as shown below:

On the title page assignee should read

-- (73) Assignee: Sanyo Electric Co., Ltd.; Tokyo Sanyo Electric Co., Ltd; and Sanyo Chemical Industris, Ltd. --

Column 10, line 37, "abosorbed" should read -- absorbed --

Signed and Sealed this

Fourth Day of June 1985

[SEAL]

Attest:

DONALD J. QUIGG

*Attesting Officer*  *Acting Commissioner of Patents and Trademarks*